June 18, 1940.                    C. R. RADEY                    2,205,273
                              ADJUSTABLE TIE DOWN
                              Filed Feb. 24, 1939            2 Sheets-Sheet 1
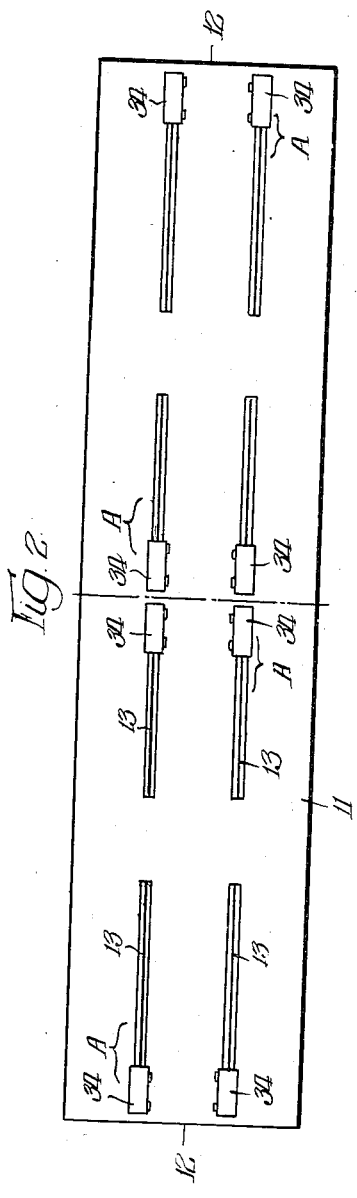
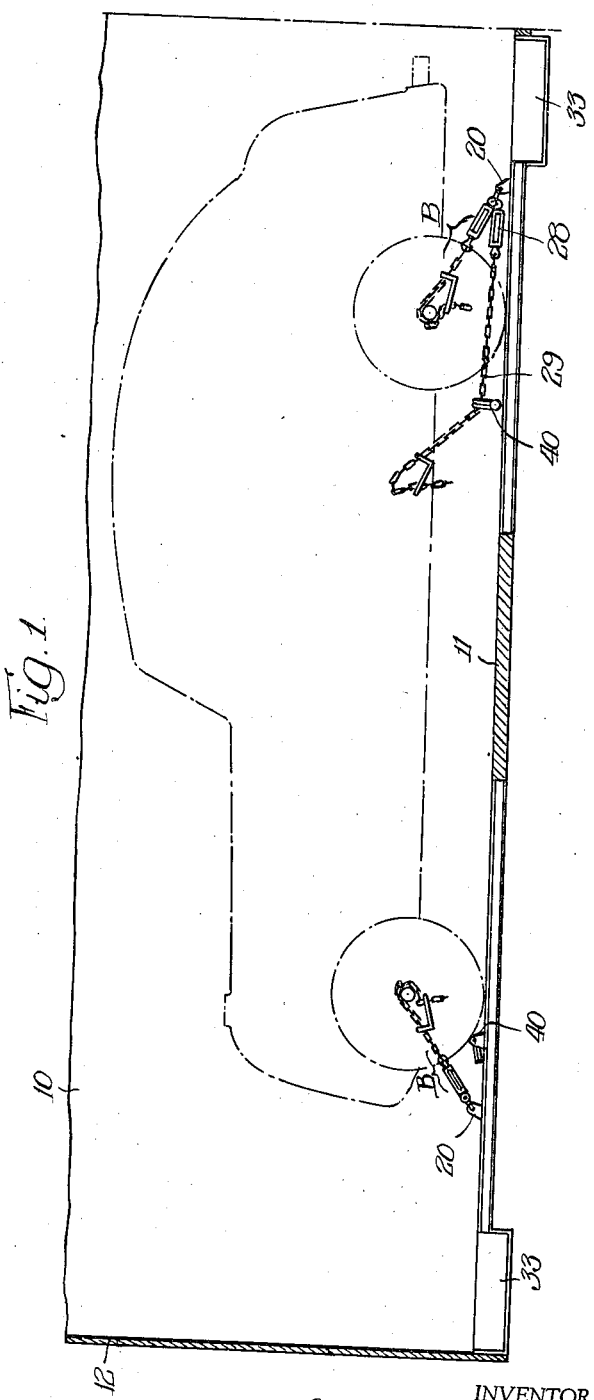
INVENTOR.
Charles R. Radey,
BY Charles L. Howard,
ATTORNEY.

June 18, 1940.
C. R. RADEY
2,205,273
ADJUSTABLE TIE DOWN
Filed Feb. 24, 1939
2 Sheets-Sheet 2
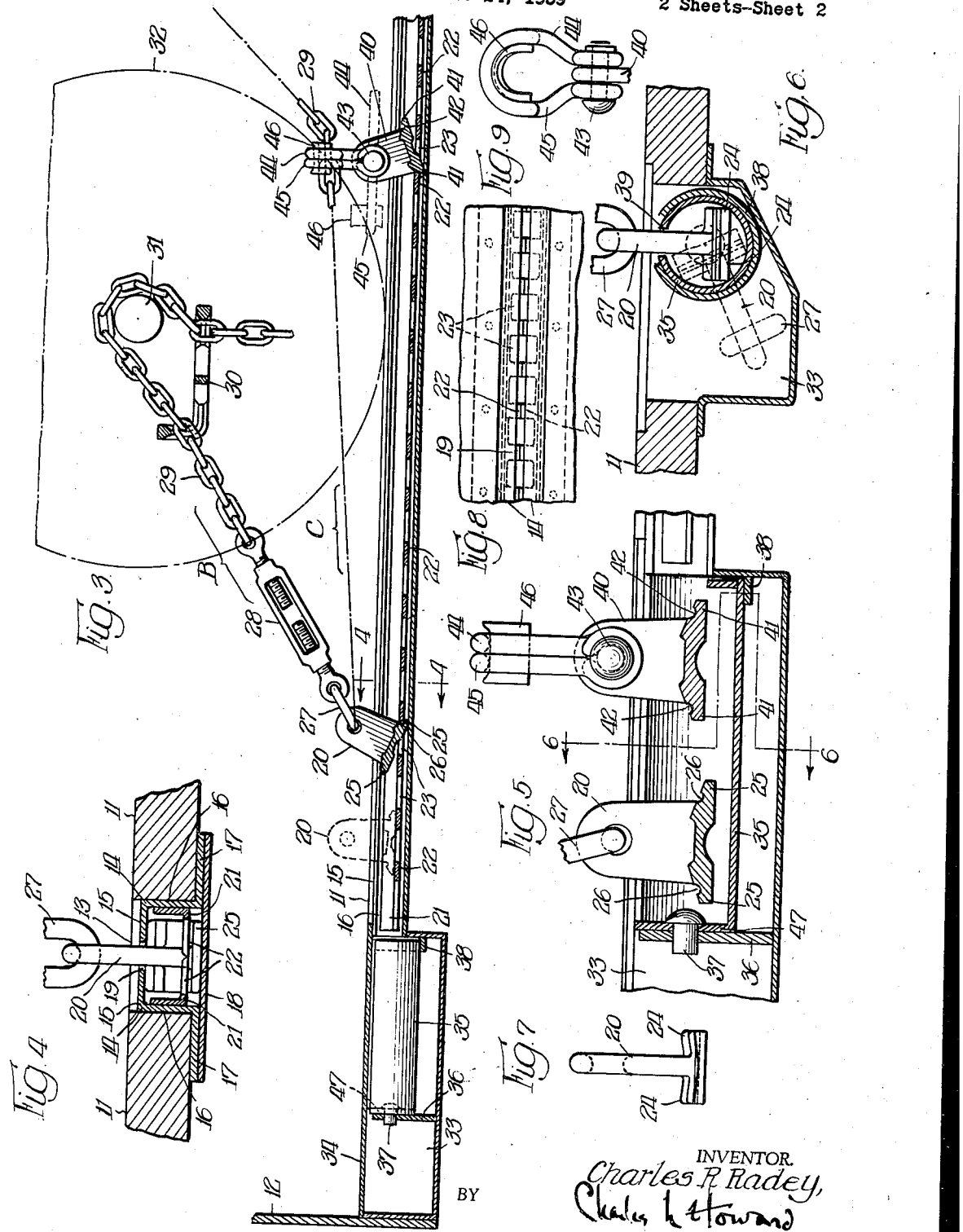
INVENTOR.
Charles R. Radey,
Charles L. Howard
ATTORNEY.

Patented June 18, 1940

2,205,273

UNITED STATES PATENT OFFICE 2,205,273

ADJUSTABLE TIE DOWN

Charles R. Radey, Michigan City, Ind.

Application February 24, 1939, Serial No. 258,269

17 Claims. (Cl. 105—368)

My invention relates to adjustable car loading devices known as tie downs or holddowns which are employed in anchoring various objects such as automobiles or other types of wheeled vehicles for transportation in or on a freight car. The invention relates particularly to novel means for anchoring the tie down to the freight car and means for storing the tie down in a pilfer-proof manner when not in use.

In loading automobiles for shipment in freight cars it is common practice to support two automobiles upon the floor of a car and to support an elevated automobile upon a deck over each of the floor supported automobiles. The floor supported automobiles are securely fastened to the floor of the freight car and held against movement by means of tie downs. While my novel anchoring means for an adjustable tie down is particularly suitable for use in anchoring a floor supported automobile for shipment in a freight car, it is understood that my invention can be used in anchoring various objects so as to secure same against movement while being transported in or on a freight car.

The principal object of my invention is to provide a freight car having tie down members attached thereto which are adjustable so that they can be moved to the desired position for attachment to the object to be secured in the car.

Another object of my invention is to provide a freight car having tie down members which are movable longitudinally of the car, and are capable of being anchored at the desired point longitudinally of the freight car.

Another object of my invention is to provide adjustable tie down members which can be anchored to the freight car and extend at the desired angle from this point of anchorage to the point of attachment of the tie down to the object that is secured in the car.

A further object of my invention is to provide an adjustable tie down member which can be anchored to a freight car at the desired point longitudinally of the car and secured to different points on vehicles of varying size and manufacture, with the turnbuckle of the tie down member in an accessible position.

Another object of my invention is to provide a freight car having adjustable tie down members which are pilfer-proof and can be stored so as to be out of the way when not in use.

Other objects of my invention will become apparent from the following description and the drawings relating thereto.

Referring to the drawings:

Fig. 1 is a side elevation of a portion of one end of a freight car, showing my novel adjustable tie down members applied to an automobile in order to hold same securely on the floor of the freight car.

Fig. 2 is a plan view of a freight car floor, showing the arrangement of the pockets and slots in a freight car which is adapted to carry two floor supported vehicles.

Fig. 3 is an enlarged side elevation, partly in section, showing one of my adjustable tie down members applied to the axle of a floor supported automobile.

Fig. 4 is a sectional view taken on the line 4—4 of Fig. 3.

Fig. 5 is an enlarged view, partly in section, of the housing and pocket in which my tie down member is stored when not in use.

Fig. 6 is a sectional view taken on the line 6—6 of Fig. 5.

Fig. 7 is a detached front elevation of the anchor shoe.

Fig. 8 is a plan view of a portion of the slot in which the anchor shoe is guided and anchored.

Fig. 9 is a fragmentary front elevation of the arms which are pivotally connected to the auxiliary anchor shoe.

Similar reference numerals and letters refer to similar parts throughout the drawings.

The floor of the car is provided with a plurality of slots which extend longitudinally of the freight car. Within these slots are carried members which guide and secure the anchor shoe to which the end of the flexible tie down member is attached. At one end of each of these slots there is a pocket beneath the floor of the car in which the anchor shoes and the adjustable tie down member are stored when not in use. As shown in Fig. 2, if a freight car is to carry two floor supported vehicles, I provide a total of eight slots with associated members and pockets in which the tie downs are anchored, guided and housed, each of these slots with its associated members being designated generally by the letter A in Fig. 2. Four of the slots are located on each side of the transverse center line of the car; two longitudinally extending, transversely spaced slots being located adjacent the end wall of the car, and two of the slots being located adjacent the center of the car.

In the embodiment of my invention as disclosed by the drawings, 10 designates a freight car including a floor 11, and an end wall 12. The roof, wheels and other details of an ordinary freight car are not shown in the drawings, a showing of these parts of the car not being necessary for a complete understanding of the present invention.

As each of the slots, pockets and associated members for guiding, anchoring and housing the anchor shoes and the tiedown member is identical, description of one is deemed to be sufficient.

As clearly shown in Fig. 4, the floor 11 is provided with a slot 13 which extends longitudinally of the car. Within this slot the freight car carries two spaced Z-bars 14, each of the Z-bars 14 including an upper horizontally disposed flange 15, the top of which is slightly below the top of the floor 11, a vertically disposed web 16 and a lower horizontally disposed flange 17. A suitable plate 18 connects the lower horizontal flanges 17 of the spaced Z-bars. The portion of the floor 11 adjacent the slot 13 rests upon the lower horizontal flange 17 of the Z-bars. The upper horizontally disposed flanges extend toward each other but the inner ends of these flanges are slightly spaced so as to define a slot 19, in which the anchor shoe 20 is slidable and adjustable in a manner which will be more fully described hereinbelow. To the inner side of the vertical web 16 of each Z-bar 14 there is welded an angle bar 21. Each angle bar 21 includes a vertical flange which is welded to the vertical web 16, and a horizontal flange 22. As shown in Figs. 3, 4 and 8, the horizontal flanges 22 of the angle bars 21 are cut out at spaced points so as to form a plurality of openings 23 in which the end of the anchor shoe 20 projects and is secured when in operative position. The inner ends of the horizontal flanges 22 meet as shown in Fig. 4. The openings 23, formed by the cut out portions of the horizontal flanges 22, are of rectangular shape as shown in Fig. 8.

The base of the anchor shoe 20 is of a general rectangular shape and includes side projections 24, front and rear projections 25 which are provided with grooves 26. To the anchor shoe 20 is secured a flexible tie down member designated generally by the letter B. This flexible tie down member is similar to that disclosed in the co-pending patent application of Ernest W. Henry, Serial No. 167,607, filed October 6, 1937, issued as United States Patent No. 2,165,377 on July 11, 1939, and includes a link 27, turnbuckle 28, chain 29 and chain fastening member 30. As shown in Fig. 3, the chain 29 is secured to the axle 31 of the wheel 32 of a vehicle, not shown, which is supported by the floor 11 of the freight car.

As clearly shown in Fig. 3, the slot in which the anchor shoe is movable terminates in a pocket 33 which is located beneath the floor of the freight car. The pocket 33 is provided with a hinged cover plate 34. Within the pocket 33 there is a housing 35 of cylindrical shape. The housing 35 is rotatably supported within the pocket 33, one end of the housing being pivotally connected to a support 36 by means of a pivot 37 and the opposite end of the housing 35 is rotatably supported upon a bearing 38 that is welded or otherwise suitably secured within the pocket 33.

As shown in Fig. 6 the housing 35 is provided with a slot 39 which extends longitudinally of the freight car from end to end of the housing 35.

With the cover plate 34 in open position, the housing 35 can be manually rotated so that the slot 39 is in alignment with the slot 19 defined by the spaced upper horizontal flanges of the Z-bars 14. With these slots in alignment, the anchor shoe 20, with the associated flexible tie down member B, can be moved from its operative position shown in Fig. 3 to a point within the housing 35 as shown in Fig. 5. After the anchor shoe is moved within the slot 39 of the housing 35, the housing can be rotated so that the anchor shoe 20 moves to the position shown by dotted lines in Fig. 6, whereby the anchor shoe and the associated flexible tie down member are stored within the pocket 33, beneath the floor of the freight car.

When the tie down member is not being used, the cover plate 34 is in closed position and the anchor shoes with the associated flexible tie down member, B, are stored within the pocket 33 beneath the floor of the freight car. When it is desired to use the flexible tie down member to secure a vehicle or other object to the floor of the freight car, the cover plate 34 is moved to open position. The rotatable housing 35 is then turned to the position shown in Fig. 6 whereby the anchor shoe which is housed therein assumes a substantially upright position, shown by full lines in Fig. 6, with the slot 39 of the housing in alignment with the slot 19 between the horizontal upper flanges 15 of the Z-bars 14. The anchor shoe 20, with its associated flexible tie down member B can then be moved longitudinally of the car to the desired position. The position of the anchor shoe 20 when it is being moved longitudinally is shown by dotted lines in Fig. 3. When the anchor shoe is being moved, its base is substantially parallel to the car floor and is above the horizontal flange 22 of the angle bars 21 and it can be moved along within the space defined by the spaced Z-bars 14. When the anchor shoe 20, with its associated tie down member B, has been moved to the desired position longitudinally of the car, the projection 25 of the base of the anchor member 20 is tilted downwardly within one of the openings 23 and the groove 26 of the projection 25 receives the edge of one of the sides of the horizontal flanges 22 which define the opening 23. The flexible member 29 is then secured to the axle or other suitable point of attachment on the vehicle, and the chain fastening member 30 is placed in position to lock the chain. The turnbuckle 28 is then tightened to the desired degree. This operative position of the anchoring shoe with its associated flexible tie down member is clearly shown by full line in Fig. 3 of the drawings. In this position, the anchoring shoe is locked against movement, one of the projections 25 of the base member being received within the opening 23 and locked under the horizontal flange 22 of the angle bar 21, and the opposite projection 25 abutting the underside of the upper horizontal flange 15 of the Z-bars 14.

The slot 39 of the housing 35 and the slot 19 between the Z-bars 14 are of less width than the base of the anchor shoe 20, so that after the parts are assembled the anchor shoe, with its associated flexible tie down member, is at all times pilfer-proof and cannot be readily removed from the car, although it can easily be moved longitudinally of the car from its stored position to the position at which it is anchored for use as a flexible tie down member.

In anchoring some makes of automobiles to the floor of a freight car it is desirable to attach the flexible tie down member to the axle of the automobile as shown in Fig. 3. On other makes of automobiles it is desired to secure the tie down member to the automobile underframe or to a bracket that is mounted on the underframe. My novel adjustable tie down member possesses great flexibility in that it can be conveniently attached to the desired point on vehicles of varying size and manufacture, with the turnbuckle 28 at all times in an accessible place where it can be tightened or loosened as desired.

As clearly shown in Fig. 3, I provide an auxiliary anchor shoe 40 which is slidable and anchorable within the slot defined by the spaced Z-bars 14 in a similar manner to the anchor shoe 20. The base of the auxiliary anchor shoe 40 is similar in structure to the base of the anchor shoe 20, and includes projections 41 with grooves 42 that are similar to the grooves 26 of the anchor shoe 20. The upper part of the anchor shoe 40 carries a pivot 43 about which the arms 44 and 45, that are of hook shape and adapted to embrace the chain 29, can be rotated from the closed position shown by full lines to the open position shown by dotted lines in Fig. 3. The arm 45 carries a bearing 46 that is integral therewith or suitably attached thereto. The arm 44 contacts the bearing 46 when the arms 44 and 45 are in closed operative position.

In securing my tie down member to some types of vehicles it is desired to utilize the auxiliary anchor shoe 40 as shown in Figs. 1 and 3. Referring particularly to Fig. 3, the groove 26 of the projection 25 of the anchor shoe 20 is fastened under the desired opening 23 in the angle bar 21, with the groove 26 contacting the horizontal flange 22. The turnbuckle 28 and chain 29 extend along the line C of Fig. 3 and arms 44 and 45 of the auxiliary anchor shoe 40 are moved to closed position so as to embrace the chain 29 between the hook portions of the arms 44 and 45. From this point the chain 29 extends upwardly to the point of attachment to the vehicle as shown in Figs. 1 and 3. With the tightening of the turnbuckle 28 the anchor shoe 20 and the auxiliary anchor shoe 40 are tilted toward each other as shown in Fig. 3, with the projection 41 of the base of the auxiliary anchor shoe 40 disposed within one of the openings 23 and locked under the horizontal flange 22 of the angle bar 21. Whenever the tie down is used to secure a vehicle of a type which makes it desirable to use the auxiliary anchor shoe 40, the turnbuckle 28 is disposed along the line C of Fig. 3, in an accessible position for manipulation by the operator.

When the anchor shoe 20 is in use, and the auxiliary shoe 40 is not being used, as shown on the left hand side of Fig. 1, the auxiliary anchor shoe is moved out of the housing 35 to an idle position so as to permit the moving of the anchor shoe 20 to its position of anchorage shown in Fig. 1. Whether in or out of the housing 35, the auxiliary anchor shoe 40 is always located in a position forward of the anchor shoe 20.

In storing the flexible tie down member when it is not in use, the anchor shoe 20 with its connected flexible member B and also the auxiliary anchor shoe 40 are moved along the slot 19 with the base of the anchor shoes within the space defined by the spaced Z-bars 14. The upper part of each anchor shoe is moved into the slot 39 of the housing 35, with the base of the anchor shoes within the housing 35. Fig. 5 shows both the anchor shoe 20 and the auxiliary anchor shoe 40 in the housing 35 which is located within the pocket 33. Rotation of the housing 35 moves both anchor shoes to the stored position in which the anchor shoe 20 is shown by dotted lines in Fig. 6. The flexible tie down member B is stored within the pocket 33, outside of the rotatable housing 35. When the tie down members are stored in the pockets and the freight car is to be used for other types of lading, suitable cover plates, not shown, may be used to close the slots 13 in the floor of the car.

After the original assembly of the parts, my flexible tie down member with its anchor shoe and auxiliary anchor shoe is at all times pilfer-proof and cannot easily be removed or stolen from the freight car. The upper horizontal flanges 15 of the spaced Z-bars 14 prevent the removal of both the auxiliary anchor shoe 40 and the anchor shoe 20 to which the flexible tie down member B is permanently attached. The parts are also pilfer-proof while stored in the pocket 33 because the slot 39 of the housing 35 is of narrow width and will not permit the base of the anchor shoes to pass therethrough. The outer end of the housing 35 is closed by an end wall 47. My flexible tie down member with the novel anchor shoes can readily be moved from stored position to the desired point longitudinally of the car, at which point the anchor shoe can be secured in one of the openings 23 in a manner which positively prevents longitudinal movement of the anchor shoe. From this point of anchorage the flexible tie down member B extends upwardly at the desired angle to the point of attachment to the vehicle or other object which is secured to the freight car floor by means of the tie down.

Various changes may be made in the arrangement, combination and construction of the parts of my novel tie down anchor arrangement without departing from the spirit of my invention, and it is my intention to cover by the claims such changes as may be reasonably included within the scope thereof.

I claim:

1. The combination of a freight car having a slot in the floor thereof, a pocket adjacent one end of said slot, a flexible tie down member having an anchor shoe adjustable along said slot and said pocket having a rotatable housing provided with a slot which can be aligned with said first mentioned slot and form a continuation thereof into which the anchor shoe can be moved from said first mentioned slot, said rotatable housing being adapted to receive the anchor shoe and move said anchor shoe to a stored position beneath the floor of the car.

2. The combination of a freight car having a slot in the floor thereof, the slot adapted to receive the anchor shoe of a flexible tie down member and retain said anchor shoe in one of a plurality of positions and a storage pocket adjacent one end of the slot, the storage pocket having a rotatable housing mounted therein, said housing being provided with a slot which can be aligned with and form a continuation of said floor slot whereby the anchor shoe can be moved along said floor slot into said housing slot and stored beneath the freight car floor upon rotation of said housing.

3. The combination of a freight car having a slot in the floor thereof, the slot adapted to receive the anchor shoe of a flexible tie down member and a storage pocket adjacent one end of the slot, the storage pocket having a rotatable housing mounted therein for receiving the anchor shoe and moving said anchor shoe to a stored position beneath the freight car floor, said rotatable housing being provided with a slot which forms a continuation of said floor slot whereby the anchor shoe can be moved horizontally along said floor slot into the housing slot, the anchor shoe being provided with an enlarged base portion which prevents removal of the anchor shoe through the floor and housing slots so that the anchor shoe is pilfer-proof in both stored and operative positions.

4. A freight car floor having a pilfer-proof adjustable flexible tie down member secured thereto, including the combination of a slot in the floor adapted to receive the anchor shoe of a tie down member, means within said slot for securing the anchor shoe at the desired point, a pocket adjacent one end of said slot for storing the flexible tie down member and a rotatable housing within said pocket, said rotatable housing having a slot which forms a continuation of said floor slot along which the anchor shoe can be moved, the rotatable housing adapted to receive the anchor shoe and move the anchor shoe to a stored position beneath the floor of the car and said anchor shoe being provided with an enlarged base portion which prevents removal of the shoe from the car.

5. The combination of a freight car floor having a slot therein in which the anchor shoe of a tie down member is adjustable, a pocket adjacent one end of said slot, the pocket having a rotatable housing therein provided with a slot which can form a continuation of said floor slot whereby the anchor shoe can be moved along said floor slot into the slot in the housing, the housing being adapted to receive the anchor shoe and move said anchor shoe to a stored position beneath the floor of the car, the other parts of said tie down member being stored in the pocket outside of said housing.

6. A pilfer-proof flexible tie down member adapted to secure an object to the floor of a freight car including the combination of a car floor having a slot therein in which the anchor shoe of a tie down member is anchorable in one of a plurality of positions, a pocket adjacent one end of the slot for storing the flexible tie down member, a housing within said pocket adapted to receive the anchor shoe and move the anchor shoe to a stored position upon rotation of the housing and a cover plate for said pocket, said housing being provided with a slot which forms a continuation of said floor slot whereby the anchor shoe can be moved along said floor slot to the slot in said housing, and said anchor shoe having an enlarged base portion disposed beneath said slots which prevents removal of the flexible tie down member from the car.

7. The combination of a freight car having a slot in the floor thereof, a storage pocket adjacent one end of the slot, a flexible tie down member having an anchor shoe adjustable along said slot, the anchor shoe being provided with an enlarged base adapted to prevent removal of said anchor shoe from the slot, the pocket having therein a rotatable housing provided with a slot which aligns with and forms a continuation of said slot in the car floor and said slot in said rotatable housing being adapted to receive the anchor shoe, the enlarged base portion being within said housing and adapted to prevent removal of the anchor shoe from the housing.

8. The combination of a freight car floor having a slot extending longitudinally of the car, a flexible tie down member having an anchor shoe at one end thereof adapted to be moved within said slot and anchored at the desired point longitudinally of the car, the flexible tie down member extending upwardly from the point of anchorage at the desired angle to the point of attachment of the flexible member to an object to be secured to the car floor, a pocket beneath the floor of the car adjacent one end of said slot in which pocket the anchor shoe and flexible tie down member may be stored when not in use and a rotatable housing within said pocket adapted to receive the anchor shoe and on rotation of the housing move the anchor shoe to a stored position beneath the freight car floor, said housing having a slot which forms a continuation of said floor slot, whereby the anchor shoe can be moved horizontally along said floor slot into the slot of the housing, and the anchor shoe having an enlarged base portion which prevents removal of said shoe from the slots with which it is associated.

9. The combination of a freight car floor having a slot therein extending longitudinally of the car, a flexible tie down member having an anchor shoe at one end thereof adapted to be moved within said slot and anchored at the desired point longitudinally of the car by means of an enlarged rectangular base of the anchor shoe cooperating with members within said slot for securing the anchor shoe, the opposite end of said flexible tie down member attached to an object to be secured to the car floor and a storage pocket beneath the floor of the car adjacent one end of said slot in which pocket the anchor shoe and flexible tie down member may be stored when not in use, said pocket being provided with a rotatable housing having a slot which forms a continuation of said first mentioned slot, the anchor shoe being capable of horizontal movement along said slots from stored to operative position and vice versa.

10. The combination of a flexible tie down member having one end which is adapted to be secured to an object supported by a freight car floor, the opposite end of said flexible tie down member comprising an anchor shoe which is slidable within a slot in the car floor and a pocket adjacent one end of the slot, said pocket having a housing mounted therein in which the anchor shoe can be moved, said housing being provided with a slot which forms a continuation of the floor slot whereby the anchor shoe can be moved horizontally along the floor slot into the slot in said housing, said anchor shoe having an enlarged base portion which prevents removal of the tie down member from the car, the housing being rotatable and adapted to carry the anchor shoe to a stored position beneath the freight car floor.

11. A pilfer-proof tie down member for securing objects to the floor of a freight car including an anchor shoe which is movable in a slot extending longitudinally of the car floor, said slot having a pair of opposed Z-bar associated therewith, the upper horizontal flanges of the Z-bars projecting toward each other and being spaced and defining a second slot in which the upper part of the anchor shoe is movable, said anchor shoe being provided with an enlarged base within the area defined by the spaced Z-bars and a storage pocket adjacent one end of said slot, the pocket having a rotatable housing therein provided with a slot adapted to be aligned with and form a continuation of the slot defined by the spaced upper horizontal flanges of the Z-bars, the anchor shoe adapted to be moved horizontally in the slot of the housing whereby the base member of the anchor shoe is within said housing.

12. The combination of a freight car floor having a slot therein, spaced Z-bars associated with said slot, the Z-bars being opposed and having upper horizontal flanges which project toward each other and define a second slot, a pocket adjacent one end of said slots, said pocket having mounted therein a rotatable housing provided with a slot which aligns with and forms a continuation of said first mentioned slots, a flexible tie down member having an anchor shoe connected to one end thereof, the anchor shoe being movable within said slots, said anchor shoe being provided with a rectangular base which is housed within the space defined by the spaced Z-bars, and means connected to said Z-bars and cooperating with the base of the anchor shoe for securing the anchor shoe at the desired point, the opposite end of said flexible tie down member being secured to an object supported by the freight car floor.

13. Apparatus for guiding, anchoring and storing an anchor shoe having a flexible tie down member attached thereto including a freight car floor having a slot therein, a pair of opposed Z-bars adjacent the slot, the upper horizontal flanges of the Z-bars projecting toward each other and defining a second slot in which the anchor shoe is guided, the anchor shoe having an enlarged base portion movable in the space defined by the Z-bars, means attached to said Z-bars for anchoring the anchor shoe at desired points, a pocket at the end of said slot adapted to store the flexible tie down member, said pocket having a rotatable housing mounted therein which is provided with a slot capable of alignment with so as to form a continuation of the slot defined by the upper flanges of the spaced Z-bars, the anchor shoe being adapted to be moved horizontally into the slot in the housing with the base of said anchor shoe within the housing, the anchor shoe being moved to a stored position beneath the car floor upon rotation of the housing.

14. In combination with a freight car having a slot in the floor thereof, an anchor shoe movable along said slot, means beneath the slot for securing the anchor shoe at the desired point, a pocket beneath the floor of the car at one end of said slot, and a housing rotatably mounted within the pocket, the housing being provided with a slot which aligns with and forms a continuation of said floor slot whereby said anchor shoe can be moved horizontally from the floor slot to the housing slot, said housing being adapted to receive said anchor shoe and move same to a stored position beneath the floor of the car.

15. The combination of a freight car having a slot extending longitudinally of the car in which an anchor shoe and auxiliary anchor shoe of a flexible tie down member are slidable, a pocket beneath the car floor adjacent one end of said slot and a housing within the pocket adapted to receive the anchor shoe and auxiliary anchor shoe, said housing being provided with a slot which can be aligned with said first mentioned slot so as to form a continuation thereof whereby the anchor shoe and auxiliary anchor shoe can be moved horizontally along said floor slot into the housing slot and means for moving the anchor shoes to a stored position beneath the freight car floor upon rotation of said housing.

16. A freight car having means for securing an object to the floor thereof including a slot in the freight car extending longitudinally of the car, a flexible tie down member having an anchor shoe movable within said slot, means beneath the floor of the car for securing the anchor shoe at the desired point longitudinally of the car and a pocket adjacent one end of the slot, said pocket having a rotatable housing provided with a slot which can be aligned with said first mentioned slot so as to form a continuation thereof whereby the anchor shoe can be moved horizontally from the floor slot to the housing slot and stored beneath the floor of the car on rotation of the housing.

17. The combination of a freight car floor having a slot therein, spaced Z-bars associated with said slot, the Z-bars having upper horizontal flanges which project toward each other and define a second slot, a storage pocket adjacent one end of said slots having mounted therein a rotatable housing provided with a slot which aligns with and forms a continuation of said first mentioned slots, a flexible tie down member having an anchor shoe connected to one end thereof, the anchor shoe being movable within said slots and provided with a rectangular base which is housed within the space defined by the spaced Z-bars, an angle bar secured by a vertical arm to the web of each Z-bar, the angle bars being provided in their horizontal arms with cut-out portions adapted to receive and anchor the base of the anchor shoe, the opposite end of said flexible tie down member being secured to an object supported by the freight car floor.

CHARLES R. RADEY.